United States Patent [19]
Gruenwald

[11] 3,937,855
[45] Feb. 10, 1976

[54] METHOD OF CURING VACUUM PRESSURE IMPREGNATED COILS

[75] Inventor: Geza Gruenwald, Erie, Pa.

[73] Assignee: General Electric Company, Erie, Pa.

[22] Filed: June 21, 1974

[21] Appl. No.: 481,900

[52] U.S. Cl. ............... 427/54; 427/116; 427/294; 427/342; 427/390; 264/272
[51] Int. Cl.² ................. B05D 3/06; H01F 5/06
[58] Field of Search............ 117/93, 31, 232, 161 K; 427/54, 385, 104, 116, 294, 340, 342, 390; 264/272

[56] References Cited
UNITED STATES PATENTS

| | | | |
|---|---|---|---|
| 2,829,191 | 4/1958 | Rogers | 117/93.31 |
| 2,956,613 | 10/1960 | Edelman et al. | 427/358 |
| 2,963,747 | 12/1960 | Brown | 264/22 |
| 3,139,657 | 7/1964 | Maly | 264/83 |
| 3,240,848 | 3/1966 | Burke et al. | 264/102 |
| 3,369,947 | 2/1968 | Mertens et al. | 156/315 |
| 3,531,699 | 9/1970 | Peck | 264/272 |
| 3,778,536 | 12/1973 | Smearing | 156/305 |

Primary Examiner—J. H. Newsome
Attorney, Agent, or Firm—D. F. Bigelow; A. S. Richardson, Jr.

[57] ABSTRACT

After vacuum pressure impregnating an insulated coil with liquid polyester resin the outer surface of the combination is treated to cause a quick low temperature gellation of an outer shell of the resin to thereby encapsulate the remaining liquid portion. A subsequent high temperature cure is imposed for a relatively long period of time to solidify the liquid inner portion and to fully cure the resin throughout the insulation.

8 Claims, 2 Drawing Figures

METHOD OF CURING VACUUM PRESSURE IMPREGNATED COILS

BACKGROUND OF THE INVENTION

This invention relates generally to electrical insulation methods and more particularly to methods of curing resin impregnated insulation structures.

A common object in the insulation of electro-magnetic coils is to obtain a high thermal conductivity of the insulation structure so as to enable an increase in current density in the coils without exposing the organic electrical insulating materials to excessively high temperatures. To this end, the process of vacuum-pressure impregnating (VPI) an insulated coil with a solventless varnish to reduce the number and size of voids in the insulation and thereby enhance its electrical insulation properties is well known in the art. In order to obtain a sufficiently long shelf life time for the resin, subsequent to the coil being impregnated, it is cured by slow curing agents which generally require heat in order to achieve a cure of the varnish within a reasonable time. The heat in turn tends to lower the viscosity of the impregnating varnish before the chemical reaction occurs thereby resulting in the draining out of substantial quantities of varnish due to gravitational forces. In particular, field coils which are cured in a stationary position are more susceptible to this phenomena than are armature coils which are commonly rotated during the curing procedure. As a consequence, many air pockets are formed within the coils and in the interstices between the coil and the pole pieces or laminations, with the air pockets tending to impede heat conductivity from the coil, and thus limiting rated power output.

A known approach to solving the resin drainage problem is that of providing additional resin curing acceleration in the outer portion of the insulation, thereby causing the resin in the outer portion to cure more rapidly and providing an impervious shell which prevents an outward loss of resin and allows a slow controlled cure of the resin in the inner portions of the insulation. This is shown in U.S. Pat. No. 3,778,536 issued to Robert W. Smearing on Dec. 11, 1973, and assigned to the assignee of the present invention. In such a process it is important that the cure acceleration is not only reactive with the resin but that it is insoluble therewith. If it were soluble with the resin it would tend to leach out into the inner portion of the resin impregnant and also into the VPI tank to contaminate the resin therein.

With the use of epoxy resins there are various known accelerators which fulfill the requirements of insolubility. However, there are certain applications where the use of epoxy resins as varnish impregnants of insulation is not desirable for other reasons. For example, when insulating the coils of a motor armature, the entire assembly of coils and rotor is normally placed in the VPI tank and impregnated with the resin. If epoxy resin is used, the coils will tend to be bonded to the armature, thereby precluding any subsequent rewinding of the coils, a process which in some industries is commonly done every few years, as for example, in the rail vehicle traction motor industry.

Another disadvantage of the use of an epoxy resin as the impregnating varnish is that it tends to cure to a hard and brittle state and therefore has a tendency to crack under stress. Further, with many cured epoxy resin compositions, they tend to increase in viscosity with shelf life, a characteristic which is undesirable for an insulation structure.

It is therefore an object of this invention to provide an insulated coil with improved thermal conductivity characteristics utilizing the superior properties of polyester resin varnishes.

Another object of this invention is the provision in an insulation assembly for preventing the drainage of varnish impregnant between the impregnating stage and the curing stage.

Yet another object of this invention is the provision for an insulated coil structure which has a long shelf life.

Still another object of this invention is the provision for accelerating the cure of the impregnant periphery without contamination of the VPI tank.

A further object of this invention is the provision for curing a varnish impregnated coil without bonding it to its support structure.

Another object of this invention is the provision for a solid insulation structure which is soft and pliable and not prone to cracking.

Yet another object of this invention is the provision for a coil insulation structure which is economical to manufacture and extremely effective in use.

These objects and other factors and advantages become more readily apparent upon reference to the following description when taken in conjunction with the appended drawings.

SUMMARY OF THE INVENTION

Briefly, in accordance with one aspect of the invention a permeable electrical insulating material is applied to a coil in sheet or tape form and the assembly is vacuum pressure impregnated with a liquid, chemical reactive, cross linkable, polyester resin. A quick curing of the resin is then induced at the periphery of the material to encapsulate the liquid resin which is subsequently slowly cured by exposure to high temperatures for longer periods of time.

In one embodiment of the invention the insulating material is impregnated with a polyester resin catalyzed for a high temperature cure and the assembly is removed from the VPI tank. A highly reactive chemical cross linking agent is then applied to the periphery of the assembly to rapidly form a gelled or cured surface thereon. The encapsulated liquid varnish is subsequently cured at elevated temperatures to form a compact homogeneous structure.

In another embodiment of the invention a quick curing of the periphery of the polyester resin impregnant is induced by exposure to ultra-violet (UV) irradiation under room temperature conditions to encapsulate the liquid core.

In the drawings as hereinafter described, a preferred embodiment and modified embodiment are depicted; however, various other modifications can be made thereto without departing from the true spirit and scope of the invention.

DESCRIPTION OF THE PREFERRED EMBODIMENT

Figure 1:
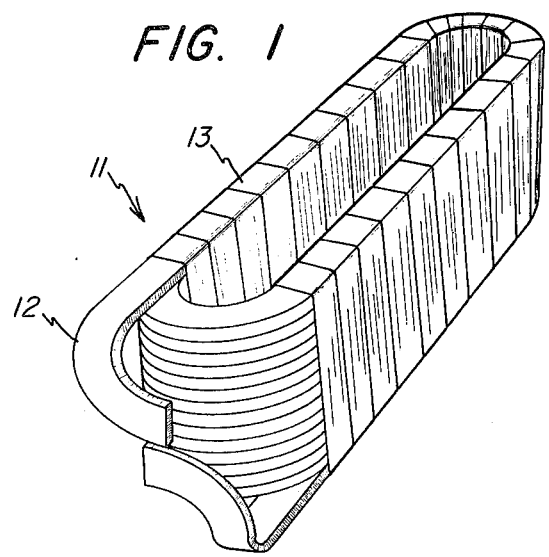
FIG. 1 shows an electro-magnetic coil partially taped with insulating material.

Referring now to FIG. 1, a coil 11 is shown having multiple windings 12 around which are wrapped a plurality of layers of dielectric material 13. The coil 11 is typical of that used for the field coils in a motor or generator; however, the process of the present invention applies as well to any coils having a dielectric material applied thereto which is vacuum pressure impregnated with a solventless varnish to form a substantially homogeneous structure exhibiting high thermal conductivity characteristics. Typically the dielectric material 13 comprises a composite of mica and glass tape or the like which is wrapped either by machine or by manual operation. Alternatively the coil may be helically wrapped with alternate layers of absorbent tape and dielectric tape. The wrapped coils may subsequently be treated individually or they may be installed in their respective component with that component subsequently being subjected to the appropriate conditions for completion of the process. For example, in the case of motor field coils, the wrapped coils may be installed in the stator and the stator with its plurality of coils is then passed through the remaining phases of the process.

Figure 2:
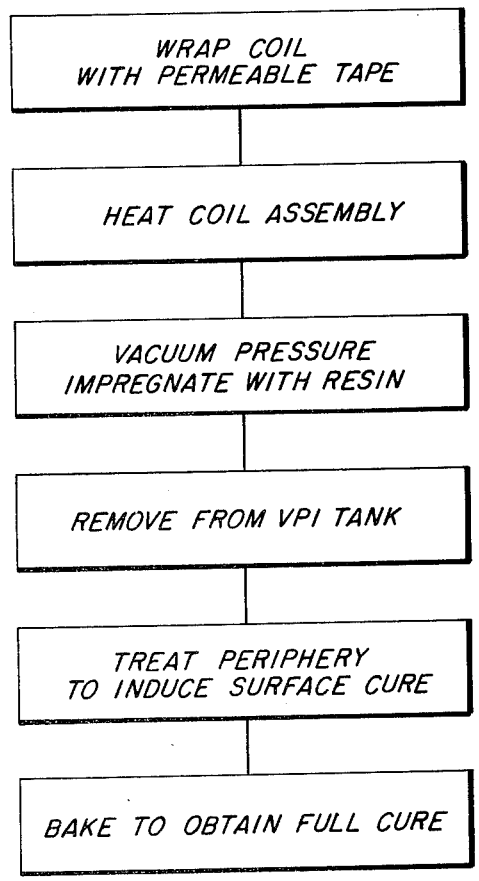
FIG. 2 illustrates a process flow chart indicating sequential steps in accordance with an embodiment of this invention.

The sequence of steps following the winding process is indicated in FIG. 2 wherein the coil is heated to eliminate any moisture or volatiles that may be present therein. After its temperature is reduced, it is placed in a vacuum impregnating tank wherein a vacuum is drawn to remove gases from the wrapping. The insulating material 13 is then impregnated with a liquid resin and pressurized to further the impregnation process before removing the coil from the VPI tank. A quick cure of the periphery is then induced in a manner described hereinafter and the assembly is then baked in an oven for a longer period of time to cure the remaining liquid resin to a solid condition. The impregnating resin used in the process is preferably of the polyester type which upon being heated, polymerizes into a tough, elastic resinous body.

One of such resins which is commercially available is that made by the General Electric Company and commonly known as GE-702 resin. The polyester resins employed are liquids having a viscosity of 300 to 2,000 cps and being substantially free of solvents. They consist of resinous esterification products of aromatic dicarboxylic acids or their anhydrides, unsaturated dicarboxylic acids or their anhydrides and long chain dicarboxylic acids with aliphatic diols such as ethylene glycol, propylene glycol, dimethyl propylene glycol, butylene glycol, diethylene glycol, and triethylene glycol. To obtain the desired viscosity which will allow for easy impregnation, these high molecular weight polyesters are reduced with unsaturated reactive monomers such as styrene, vinyl toluol, dichloro styrene, diallyl phthalate, and triallyl cyanurate.

Another additive is an elevated temperature catalyst to assist in the hardening process when the resin is subjected to high temperatures for relatively long periods of time. Examples of catalysts used are dicumylperoxide and tertiary-butyl perbenzoate.

Still further, depending on the peroxide applied, a cobalt naphthenate, cobalt octoate, or tertiary amine activator such as dimethyl aniline or diethyl aniline may be added to the resin to speed up the reaction.

After the coil has been impregnated with resin, it is removed from the VPI tank and immediately treated on its outer surface to cause that surface to harden or cure before there is any significant drainage of the resin from the coil. In this way the liquid resin in the bulk of the insulating material is encapsulated within the shell of the quickly cured periphery where it remains throughout the subsequent slow curing process at elevated temperatures.

In accordance with the preferred embodiment of the invention quick gellation or curing of the varnish periphery at low temperature is accomplished by subjecting the surface of the impregnated coil to a highly reactive chemical cross linking agent. The agents are solutions in plasticisers or monomers of organic peroxides such as methyl ethyl ketone peroxide, methyl isobutyl ketone peroxide, cyclohexanone peroxide, bis (1-hydroxycyclohexyl) peroxide, diacetyl peroxide, isopropyl percarbonate, dilauryl peroxide, cumyl hydroperoxide and benzoylperoxide. The diisocyanates can also be used but are not preferred because of their toxic nature.

These agents can be applied to the surface of the impregnated coil in any of a number of ways, as for example, in a spray booth by means of a conventional paint spray gun or by exposing the impregnated coil for a short period of time to a finely divided mist of the agent in a fog chamber. The agent will tend to migrate inwardly into the resin (approximately 30–60 thousandths of an inch) before curing so as to provide a substantial skin around the liquid resin upon curing.

In accordance with an alternate embodiment of the invention quick gellation or curing of the varnish periphery at ambient temperature is accomplished by the incorporation of an ultra-violet radiation activator such as Trigonal 14, which is isobutyl benzoin ether, produced by Noury Chemical Corporation, as the VPI resin and the ultra-violet irradiation of the impregnated coil.

The following example illustrates the use of a suitable agent in curing a polyester resin in accordance with this invention.

EXAMPLE 1

An edgewise wound field coil was wrapped with turn insulation consisting of 0.010 inch asbestos paper and with ground insulation of two wrappings of half lapped creped Nomex, an aromatic nylon fiber based paper, and two layers of glass cloth. The coil was heat dried and then vacuum-pressure impregnated with a solventless polyester resin varnish containing a catalyst, dicumyl peroxide, a diluent, vinyl toluene, and an activator 0.5% cobalt naphthenate. After removal from the vacuum tank, the coil was sprayed with a 50% methyl ethyl ketone peroxide solution and transferred to an oven at 125°C for cure. The outside skin of the insulation gelled rapidly within 1 to 2 minutes and the remainder within 2 hours after which time the temperature of the oven was increased to 165°C for final cure. The amount of resin drippings was significantly reduced and a solid void-free insulation obtained.

In accordance with the modified embodiment of the invention, a quick cure of the polyester resin periphery is accomplished by ultra-violet (UV) irradiation of the outer surface of the impregnated coil. An illustrative example of such a process is as follows.

EXAMPLE 2

A steel bar 3 inches wide was wrapped with two layers of creped Nomex and two layers of glass cloth to represent a section of a field coil. The bar was then vacuum pressure impregnated in a solventless polyester varnish containing the diluent vinyl toluene, the catalyst dicumyl peroxide, and the activator, 1% Trigonal 14. The bar was removed from the VPI tank and subjected at its periphery to the irradiation of a UV source (black light lamp) for 2 minutes in which time the surface of the impregnated bar cured and lost its tackiness. The cure of the internal portion of the resin was subsequently accomplished in an oven at 125°c for 2 hours followed by a final cure at 165°C for 2 hours. A 2½ inch square section of the cured insulation was cut from both the irradiated and the non-irradiated sides of the bar to view the internal structure of the cured resin. The surface of the UV irradiated side was shiny and saturated whereas the surface of the opposite, non-irradiated, side appeared dull and dry. The weight of the UV irradiated section was 9.128 grams, whereas the non-irradiated section weighed only 8.069 grams, the balance in weight being lost due to drainage.

What I claim as new and desire to secure by Letters Patent of the United States is:

1. A method of insulating an electro-magnetic coil comprising the steps of:
   a. applying a permeable electrical insulating material to the coil;
   b. applying a first chemical catalyst throughout said material, said chemical catalyst being reactive with a resin at elevated temperatures but relatively unreactive therewith at room temperatures;
   c. vacuum pressure impregnating said material throughout with a liquid, chemically reactive, cross linkable resin;
   d. thereafter inducing a quick cure to solidify said resin on the surface of said impregnated material, thereby encapsulating the liquid resin which is in the bulk of said material; and
   e. subsequently exposing said material to elevated temperatures to cure said liquid resin and thereby form a solid structure throughout said material.

2. A method of insulating an electro-magnetic coil as set forth in claim 1 wherein said first chemical catalyst is added to said liquid resin and the steps of applying said catalyst and of impregnating said material with said resin are accomplished concurrently.

3. A method of insulating an electro-magnetic coil as set forth in claim 1 wherein said cross linkable resin is a polyester resin.

4. A method of insulating an electro-magnetic coil as set forth in claim 1 wherein the step of inducing curing is accomplished by applying to the surface of the impregnated material a highly reactive chemical cross linking agent.

5. A method of insulating an electro-magnetic coil as set forth in claim 4 wherein said cross linking agent is of the class of peroxides.

6. A method of insulating an electro-magnetic coil as set forth in claim 1 wherein the step of inducing curing is accomplished by the ultra-violet irradiation of the outer surface of the impregnated material.

7. A method of insulating an electro-magnetic coil as set forth in claim 1 wherein the step of quick curing said resin on the surface is accomplished within a period of less than 3 minutes.

8. A process for treating the surface of an insulated coil impregnated with a polyester resin to prevent the resin from draining out during a subsequent heating process comprising:
   exposing the surface of the coil to an accelerator agent selected from the group consisting of peroxides and isocyanates.

* * * * *